United States Patent [19]

Clark

[11] 4,164,327

[45] Aug. 14, 1979

[54] GRAIN SPREADER

[76] Inventor: Donald Y. Clark, Rte. 1, Central City, Nebr. 68826

[21] Appl. No.: 894,391

[22] Filed: Apr. 7, 1978

[51] Int. Cl.[2] .............................................. B65G 65/32
[52] U.S. Cl. .................................... 239/669, 239/683; 414/301
[58] Field of Search ............... 239/665, 666, 668, 669, 239/681, 683, 687, 689; 214/17 CB

[56] References Cited

U.S. PATENT DOCUMENTS

| | | | |
|---|---|---|---|
| 3,563,476 | 2/1971 | Donelson, Jr. | 214/17 CB |
| 3,989,194 | 11/1976 | Parker | 239/666 |

FOREIGN PATENT DOCUMENTS 779767  7/1957  United Kingdom ......... 239/683

*Primary Examiner*—Robert W. Saifer
*Attorney, Agent, or Firm*—Berman, Aisenberg & Platt

[57] ABSTRACT

A spreader for feeding and uniformly distributing grain in a bin. The spreader has a hopper to receive the incoming grain. A screw mounted in the hopper evenly spreads the grain and propels it into a chute whose discharge mouth is normally closed by a spring pressed gate, or valve. A rotary thrower blade, mounted below the chute, aids the chute to distribute the grain generally radially and downwardly uniformly in the bin. The screw, the discharge chute and the thrower are driven as a unit by a single shaft, mounted coaxially in the hopper, and rotated by a motor mounted externally of the hopper. The pressure of grain movement propelled by the screw opens the chute gate allowing grain to pass to the spreader.

17 Claims, 4 Drawing Figures

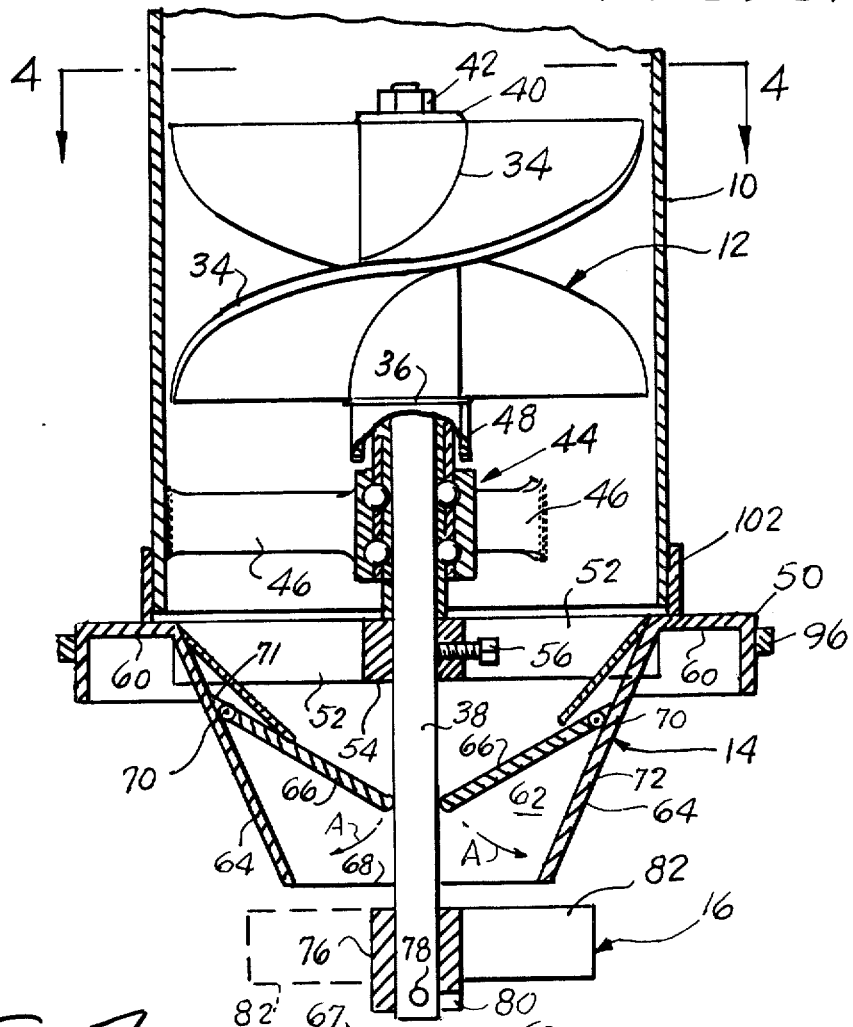
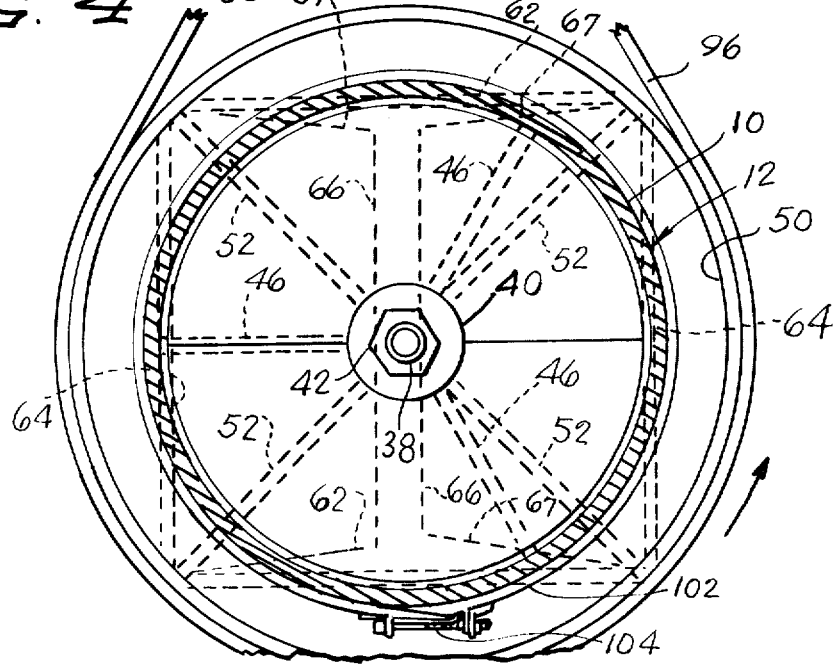

GRAIN SPREADER

FIELD OF THE INVENTION

This invention relates to devices for distributing or spreading material for granular nature, and more particularly to a distributor for use in a grain bin, silo, or like closed storage space, to effectively distribute therein material to be stored, such as corn or other grain, in a uniform manner.

STATE OF THE PRIOR ART

It is customary practice to move grain, or other material to be stored in a closed storage space such as granaries, silos and the like, by a conveyor or pipe discharging the grain into a fill opening in the top wall of the storage structure. Conventional spreaders are mounted in the fill opening to uniformly distribute the grain in the storage chamber. Such spreaders usually comprise a funnel-shaped hopper and a motor driven thrower plate adjustably inclined below the hopper to throw the grain radially outwardly as it leaves the hopper. Other types of rotary throwers have been proposed such as a conical member having fins on its surface and an open wheel construction having radial vanes.

All of the conventional spreaders present a problem in that they usually operate to fill the bin to a higher level on one side necessitating the extra time and expense of shoveling at least a truck load of grain, a shovel full at a time, across about 21 feet or more of bin space to level the grain. This is because usually one man loads the bin and it is virtually impossible for him, even with additional help, to keep the conveyor feeding grain constantly to the center of the hopper working 35 feet high on the roof of the bin. As a result the grain fills one side of the hopper to a higher level than the other and the thrower distributes more of the grain to one side of the bin.

SUMMARY OF THE INVENTION

It is a primary object of the present invention to provide a grain spreader which overcomes the problem, defects, and disadvantages of conventional spreaders, briefly outlined above, and to enable uniformly distributing grain in a storage bin to an equal level in all parts of the bin.

It is another important object to provide a grain spreader which is operative to uniformly distribute granular material whether dry or wet.

It is a further object of the invention to provide a grain spreader, having the above-described characteristics and advantages, which is of simple construction, easy and inexpensive to fabricate, and easy to install and operate.

These objects and advantages are achieved in the invention by providing a screw, or auger, in the hopper which evens and levels the grain being fed to the hopper and then presses the grain uniformly toward the hopper outlet. The outlet is covered by a revolving chute having a spring-pressed discharge gate in its exit. The force generated by the screw propelling the grain opens the gate so that grain uniformly passes through the chute and is discharged. The rotation of the chute centrifugally spreads the discharging grain. In addition some of the grain is contacted by a thrower blade, rotating with the chute, causing the contacted portion to be thrown further. The thrower is adjustable to subtend different parts and amounts of the discharge outlet of the chute, so that greater or less throw of the grain can be selected.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several Figures, and in which:

FIG. 3 is an enlarged, sectional view of the bottom portion of the spreader taken along line 3—3 of FIG. 2 and looking in the direction of the arrows; and FIG. 4 is a sectional view taken along line 4—4 of FIG. 3, and looking in the direction of the arrows.

DESCRIPTION OF THE PREFERRED EMBODIMENT

Figure 1:
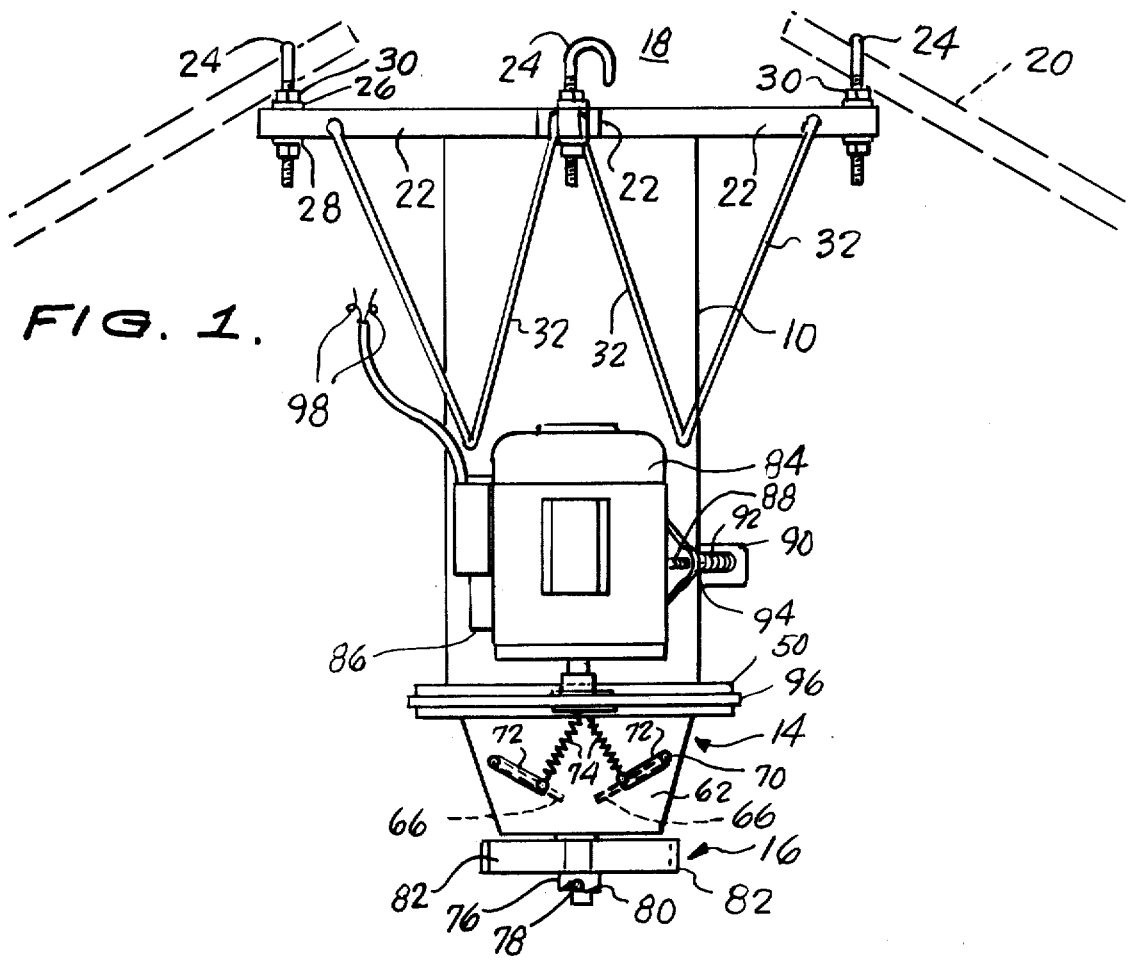
FIG. 1 is an elevational view of a grain spreader constructed in accordance with the invention.

Referring now more particularly to the drawings, the invention is shown as including the following major parts: a hopper 10, enclosing a screw 12; a rotating chute 14; and a thrower 16.

The hopper 10 is disposed vertically under opening 18 in the roof of a bin, or silo 20. Preferably, but not necessarily, the hopper is a stationary, cylindrical tube open at the top and bottom and mounted by three outwardly extending radial arms 22, which are welded or otherwise secured to the top of the hopper. The free ends of arms 22 are each provided with an adjustable J-bolt 24 which hooks over the bin opening wall. The threaded shaft of each support bolt 24 carries upper and lower adjusting nuts 26 and 28 respectively, and an upper locking nut 30. To support the bottom of hopper 10 a pair of bracing rods 32 are welded, or otherwise secured, at one end to opposite sides of each arm 22, and at the other end to the exterior of hopper 10, each pair of rods diverging downwardly.

The screw, or auger 12, FIG. 3, is mounted coaxially inside the hopper below the top and spaced from the open bottom. The screw comprises a plurality of helical propelling vanes 34 affixed to a sleeve shaft 36, which surrounds and is keyed (not shown) to a drive shaft 38. The upper end of shaft 38 is reduced in size and threaded, and the screw is held thereon by a washer 40 and nut 42. The screw is supported by the lower edge of its sleeve 36 resting on the inner race of a ball bearing 44 which journals shaft 38 in a friction free manner. The bearing 44 is secured at the center of the bottom portion of the hopper by three radial arms 46 welded at their outer ends to the interior surface of the hopper and at their inner ends to the bearing casing. Arms 46 are thin, vertical straps which tend to stop rotation of grain propelled downwardly by the screw. A protective sleeve 48 is secured to and surrounds the bottom of screw sleeve 36 and overlies a small portion of the inner race of bearing 44 to prevent grain from entering between the screw and the bearing.

The rotating chute 14 includes a wheel rim 50 having four radial spokes 52 supported by a hub 54 clamped on shaft 38 by bolt 56. The wheel rim 50 is closed by a horizontal cover disc 60 having a rectangular opening centrally therethrough. To the edges of the opening are welded, or otherwise secured, a pair of vertical, opposed, downwardly extending walls 62, and a pair of inwardly converging walls 64. The walls 62 and 64 together define a vertical chute having a rectangular opening which decreases in size from top to bottom. A pair of gates 66 are each pivoted along one edge to swing upwardly and downwardly in the direction of arrows A, FIG. 3, so as to open or partially close the discharge end 68 of the chute. For this purpose each gate, or plate 66, is welded to a pivot rod 70 along its upper edge. The rods are longer than the gates and their protruding ends pass through bearing openings in support brackets 71 and walls 62. To one outer end of each rod 70 is welded a crank arm 72 and the free end of each crank arm is secured in any desired manner to a spring 74 under tension which biases the gates 66 toward their closed positions as shown in FIG. 3, wherein the lower edges of the gates abut the shaft 38. If desired, notches can be formed in the gates to surround the shaft 38 and more fully close the chute. Under pressure of grain propelled downwardly by auger 34, the gates 66 will overcome the tension of springs 74, and the gates will swing downwardly allowing discharge of grain through opening 68 at the bottom of the chute. The side edges 67 of plates 66 are tapered slightly inwardly toward their bottoms to prevent catching grain adjacent walls 62 and permit free swinging of the plates.

Figure 2:
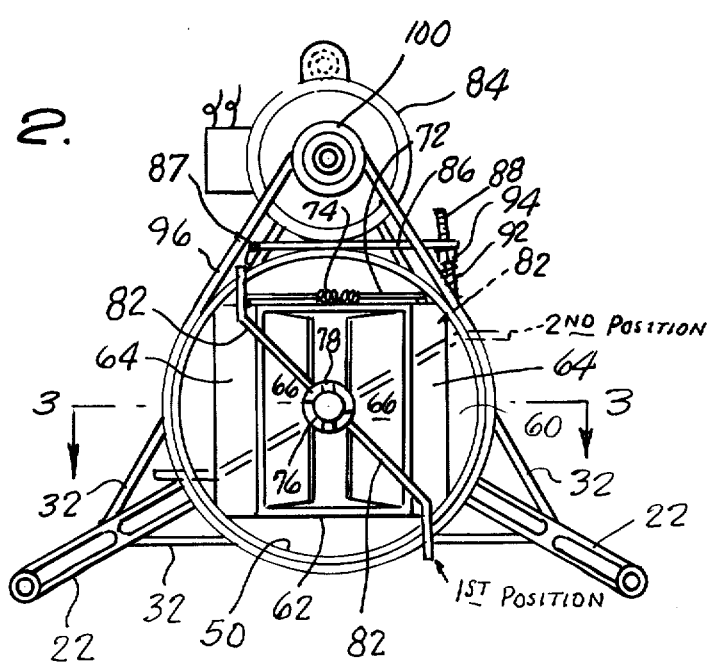
FIG. 2 is a bottom plan view of the spreader shown in FIG. 1.

The thrower, or spreader 16, comprises a hub 76 mounted on drive shaft 38 and supported by a pair of oppositely projecting pins 78. The bottom edge of the hub is formed with a plurality of ratchet or cam teeth 80 each having a cam surface and a drive surface. Four such teeth with their drive surfaces 90° apart are shown in FIG. 1 and 3. The hub has affixed to it a pair of oppositely protruding vertical arms 82, which extend radially outwardly, the outer ends of each arm being bent slightly to increase their rigidity. The hub 76 is spaced sufficiently below the outlet end 68 of the chute to permit the hub to ride upwardly on the cam surfaces of teeth 80, when rotation of shaft 38 is reversed momentarily, so as to permit the pins to engage in the alternate teeth. This changes the relative position of the thrower blades with respect to the discharge opening of the chute, as illustrated in FIG. 2 from the 1st position to the 2nd position (broken lines). This adjustment alters the amount of grain being discharged from the chute subtended by the thrower in the direction of rotation because of the rectangular configuration, and varies the amount of grain thrown outwardly by centrifugal force of the revolving chute that is struck by the thrower blades. For example, in FIG. 2, when the thrower 16 is in the number 1 position, a little of the grain is thrown by chute 14 over the top of the thrower between the chute and the thrower, but the bulk of the grain is hit by the thrower before it is thrown too far out or has dropped below the thrower. In the number 2 position of the thrower, the grain is thrown too far out and dropped too far down for the thrower to handle much of it, recognizing that both the chute and the thrower are revolving at about 300 RPM, so that there is considerable centrifugal force.

For driving shaft 38, thrower 16, wheel and chute 14 and auger 12 as a unit, a reversible electric motor 84 is mounted in a more or less conventional way on the exterior of the stationary hopper 10. One form of mounting includes a plate 86 suitably affixed by brackets, not shown, to the motor. One edge of plate 86 is hinged to the exterior of the hopper by a pivot rod 87, FIG. 2. The opposite edge of the motor mount plate has an opening through which is passed a threaded bolt 88. The bolt also passes through an opening in bracket 90 with its head engaging the invisible side as viewed in FIG. 1. Between the plate 86 and bracket 90 a compression spring 92 is sleeved over the bolt 88 and an adjustment nut 94 is threaded to vary the compression. Adjustment of the nut 94 serves to also vary the tension of the drive belt 96 to be described.

The motor 84 has energizing leads 98 and a depending vertical shaft to which is affixed a pulley 100. The endless belt 96 is trained over pulley 100 and rim 50 of the wheel-chute 14. For sealing against escape of grain between the bottom of hopper 10 and wheel disc 60, a flexible metal band 102, FIG. 3, is clamped about the hopper by end brackets and bolt 104, FIG. 4. By loosening and retightening the bolt, the band may be vertically adjusted on the hopper to permit proper clearance for the rotating wheel-chute 14.

The operation of the grain spreader described above is as follows. Grain is fed into the open top of hopper 10 by a conventional conveyor. No particular care need be taken to ensure that the entering grain falls directly into the center of the hopper. The auger 12, wheel-chute 14 and thrower 16 are rotated as a unit at a selected speed, preferably about 300 rpm, by operation of motor 84. The turning screw 12 levels the incoming grain in the hopper and propels the grain uniformly and downwardly through the open bottom of the hopper. The bearing struts 46 tend to prevent rotational movement of the exiting grain. As the grain is pushed uniformly into the open upper portion of the rotating chute 14, the plates 66 are swung downwardly by the grain pressure overcoming the pressure of springs 74 and allowing the grain to fall through the discharge mouth 68 of the chute. Since the chute is rotating, centrifugal force is applied to the discharging grain by walls 62 and 64 in an amount proportional to the distance of the grain from the center of shaft 38. Thus the chute discharged grain is given an outwardly spreading pattern by the chute walls. This spreading pattern is augmented by the rotating thrower blades 82 which spread part of the falling grain to an even greater extent. The amount of spread can be adjustably reduced by moving blades 82 from their 1st to their 2nd positions, upon momentarily reversing motor 84, so that drive pins 78 cam into their alternate teeth 80. Thus, as the bin or silo 20 is filled, the grain level rises but always remains horizontal because the grain is discharged uniformly from the bottom of the hopper due to the action of the auger 12. This eliminates the need to manipulate the feed conveyor to try to retain the grain feed exactly centered in the hopper. Further, the necessity to shovel a truckload of grain from one side of the bin to the other is also eliminated.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. A grain spreader comprising, a hopper having a grain inlet and a grain outlet, a power driven auger mounted within the hopper for spreading incoming grain evenly and for propelling the grain toward the outlet, a discharge chute rotatably mounted next to the hopper outlet, said chute having a grain entrance end and a grain exit end and including at least one spring pressed closure plate normally tending to prevent passage of grain through the chute, an axle for said chute, motor means for driving said chute and axle, and a thrower member mounted on said axle adjacent the exit end of the chute, whereby pressure of grain movement caused by rotation of the auger will cause said closure plate to open, allowing grain to pass uniformly through the hopper and discharge chute and to be spread evenly by the chute and the thrower member.

2. A grain spreader according to claim 1, wherein said auger is mounted on said chute axle and said motor means serves to drive the auger, the chute and the thrower as a unit.

3. A grain spreader according to claim 2, wherein said motor means is an electric motor mounted on the exterior of said hopper and is drivingly connected by a pulley and an endless belt trained about a wheel affixed to the chute and said pulley.

4. A grain spreader according to claim 3, wherein said axle is vertically disposed.

5. A grain spreader according to claim 4 wherein said hopper is cylindrical.

6. A grain spreader according to claim 5 wherein said discharge chute has two opposed vertical walls connected to two opposed inclined walls sloping downwardly and inwardly toward said grain exit end of the chute.

7. A grain spreader according to claim 6, wherein said auger terminates above and spaced from the hopper outlet and discharge chute.

8. A grain spreader according to claim 6, wherein there is provided a sealing band about the hopper outlet end and extending to the said wheel on the chute to prevent escape of grain between the hopper and the discharge chute.

9. A grain spreader according to claim 8, wherein said sealing band is vertically adjustable on the hopper to provide appropriate clearance with the said wheel on the discharge chute.

10. A grain spreader according to claim 6, wherein there is provided a pair of said closure plates in the discharge chute, each swingable along one edge from a closed position in which the opposite edge abuts said axle to an open position in which the opposite edge abuts an inclined wall of the discharge chute.

11. A grain spreader according to claim 10, wherein each of said closure plates is secured along one edge to a pivot rod whose ends are pivotally supported in bearing brackets mounted on one of said inclined walls of the discharge chute, the ends of each rod passing through openings in the vertical walls of the chute near the connecting corners with the inclined walls.

12. A grain spreader according to claim 11, wherein one end of each pivot rod outside the discharge chute is secured to an arm whose free end is connected to a spring under tension so as to hold the closure plate in chute closing position.

13. A grain spreader according to claim 11, wherein there is additionally provided a pair of inclined sealing plates each attached along one edge to the inner surface of an inclined wall of the discharge chute and extending downwardly and inwardly to overlie a pivot rod and prevent access of grain thereto.

14. A grain spreader according to claim 5, wherein said thrower member comprises a vertical strap disposed horizontally under the discharge chute and having a central hub through which said axle passes and to which the axle is connected.

15. A grain spreader according to claim 14, wherein said axle is connected to the thrower member by pin means on the axle cooperating with slot means on the hub.

16. A grain spreader according to claim 15, wherein the outer ends of said strap are bent out of the plane of the strap.

17. A grain spreader according to claim 15, wherein said slot means comprises a plurality of ratchet teeth on the bottom edge of the hub, each tooth having a cam surface and a drive surface, whereby to permit relative adjustment between the positioning of the thrower strap and the exit end of the discharge chute.

* * * * *